INVENTOR
JOHN W. B. BARGHAUSEN

May 31, 1960  J. W. B. BARGHAUSEN  2,939,126
MASS SPECTROMETER ARRANGEMENT
Filed Sept. 15, 1954  8 Sheets-Sheet 7

INVENTOR
JOHN W. B. BARGHAUSEN
BY
ATTORNEYS

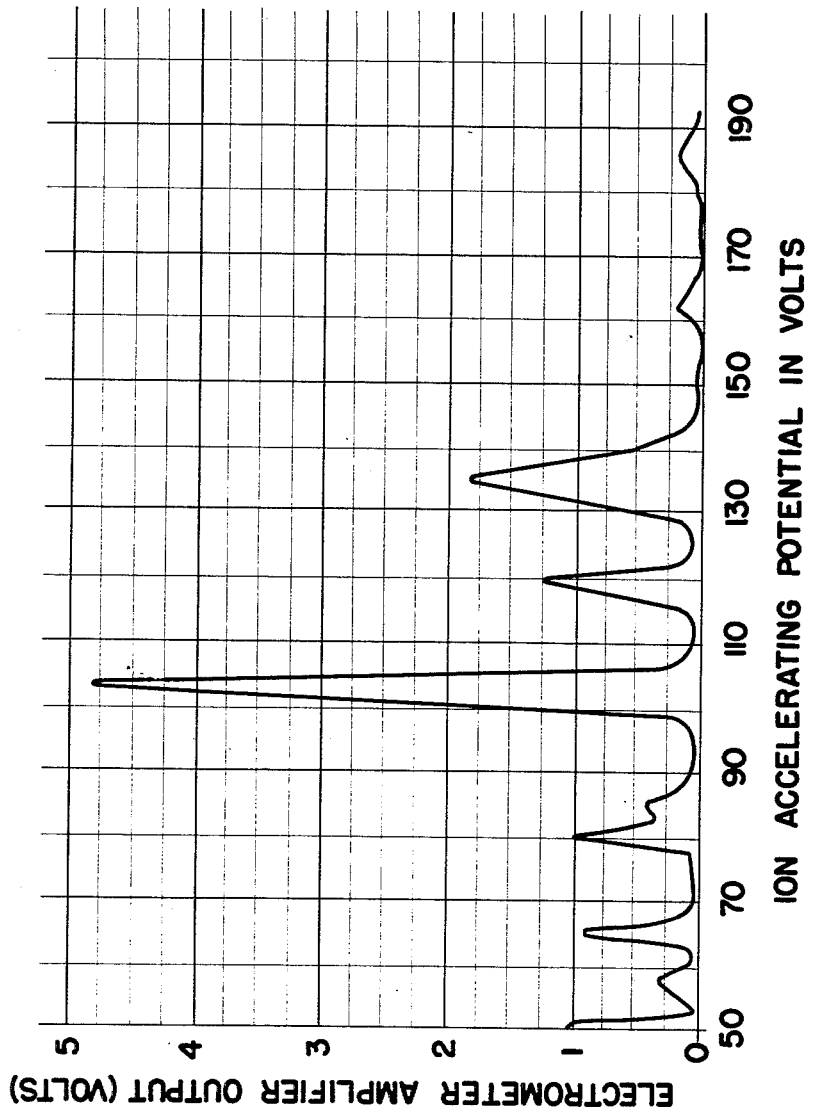

United States Patent Office 2,939,126
Patented May 31, 1960

2,939,126

MASS SPECTROMETER ARRANGEMENT

John W. B. Barghausen, West Hyattsville, Md., assignor to the United States of America as represented by the Secretary of the Navy Filed Sept. 15, 1954, Ser. No. 456,351

2 Claims. (Cl. 340—345)

The present invention relates generally to a mass spectrometer designed especially for obtaining upper atmosphere gas analyses. That is to say, the invention is more particularly concerned with a new type mass spectrometer for measuring the abundance ratio of the principal atmospheric components, that is, nitrogen and oxygen, near 100 kilometers altitude.

With a reliable measurement of the abundance ratio, it is possible, using already existing data as to temperature and pressure, and the diffusion level dependence tables, to determine the applicability of the diffusion theory, and thus permit predictions of the composition of the atmosphere of the earth at much higher altitudes.

One object, therefore, of the present invention is to provide mass spectrometer apparatus for use in a high altitude rocket for measuring the principal atmospheric components.

Another object of the invention is to provide mass spectrometer apparatus that can be used to give a reliable measurement of the abundance ratio of nitrogen and oxygen.

It is another object of the invention to provide apparatus for determining the applicatory region of the diffusion theory concerning high altitude atmospheric constitution.

Other objects and many of the attendant advantages of this invention will be readily appreciated as the same becomes better understood by reference to the following detailed description when considered in connection with the accompanying drawings wherein:

Fig. 8 illustrates a curve of amplifier voltage output versus the ion accelerating potential in volts.

According to the present invention, a mass spectrometer, which includes a spectrometer radio tube and an associated amplifier, together with a power supply, timer and a telemetering system, is arranged to be used with a high altitude aerial missile, such as a rocket, although not limited in application thereto. The spectrometer tube is evacuated to a pressure of about $10^{-6}$ mm. Hg, and is then sealed off. Immediately prior to the launching of the high altitude aerial rocket and until the time the rocket reaches the peak of the trajectory, the spectrometer tube and associated equipment operate with the tube in the evacuated, sealed-off condition. Near the peak of the trajectory, a radio command signal from the ground to a fuel cut-off receiver in the missile releases a spring loaded hammer, operating to break down a tubulation allowing the surrounding air to enter the spectrometer tube and be analyzed. The analysis data is then telemetered over a radio link to receiving stations on the ground where information relating to the filament current, the peak value of each of the atmospheric components versus altitude, the ratio of $N_2/O_2$, and so forth are recorded.

Figure 1:
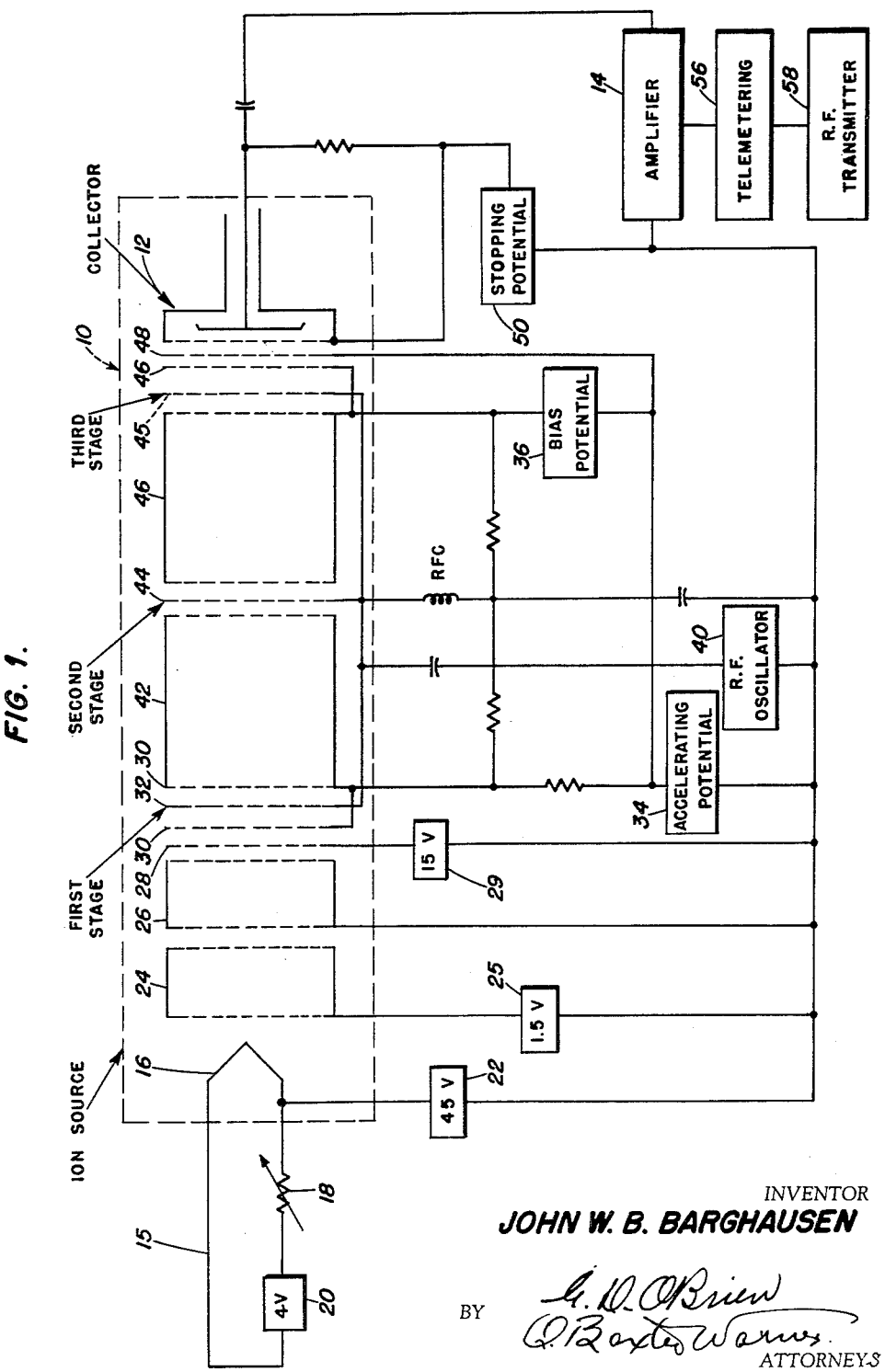
Fig. 1 is a schematic diagram of a spectrometer tube, together with the associated circuitry.

The radio frequency mass spectrometer, which is the heart of the apparatus to be described, includes a glass cylinder twelve (12) inches long and two (2) inches in diameter enclosing an ion source and three sets of tungsten wire grids spaced along the tube. In Fig. 1 there is shown a schematic of the tube together with the associated circuitry. The spectrometer is substantially identical with that described in United States Patent No. 2,535,032, to W. H. Bennett. So that this invention may be better understood, however, the spectrometer and associated circuitry will now be described.

In Fig. 1, there is shown a spectrometer tube 10 which operates on the principle that ions traveling at high velocities through a radio frequency electric field, acquire small increments of energy from the field, the magnitude of the incremental energy depending upon (1) the mass of the ion, (2) the frequency of the electric field, and (3) the phase of the electric field at the instant the ion enters the field.

Thus, in the spectrometer tube 10, a stream of ions is produced with a certain energy distribution. This stream of ions then enters an opposing D.C. field of magnitude equal to the original accelerating field plus a major portion of the R.F. field. This D.C. field repels all ions except a small number that have obtained maximum energy from the R.F. field. This small percentage of ions that actually traverse the tube 10 is collected by a collector plate 12 and measured by an amplifier 14 having a detector output.

More specifically, tube 10 has a filament circuit 15 including a filament 16 for generating or emitting electrons therefrom. Filament 16 is connected in series with a variable resistance 18 and a four (4) volt source 20. This circuit 15 is complete and is held above a negative return value with respect to all other associated circuitry. A 45 volt source 22 is connected between the filament circuit 15 and the negative return of the rest of the associated circuitry, with the exception of the filament circuit 15. It was found that the voltage from source 22 helped to produce more ion flow from the filament 16.

The electrons generated by the filament 16 travel to a grid cage 24 with a one and a half (1½) volt D.C. potential from a battery source 25 which is applied to create a D.C. field to slow up positive ions. A grounded second grid cage 26 is provided, to isolate these initial fields from succeeding fields. Those positive ions which continue through the tube 10 are attracted by a grid 28, having a 15 volt source 29, while negative ions progress to grids 30, upon which there is superimposed a high accelerating negative potential from a source 34 and a bias source 36.

A first stage R.F. grid 32 of tube 10 allows the ions that have progressed thus far up the tube 10 to associate themselves with a frequency of approximately 2.5 megacycles which is generated by an R.F. oscillator 40, in a mixing action, thus creating a phase condition and an accelerating value. From here on, the ions continue through a grid cage 42 of the second stage of the tube 10. Those ions that pass through the second stage 42 are further accelerated and are attracted by an R.F. grid 44 of the second stage, having also the frequency of 2.5 megacycles from the R.F. oscillator 40.

The ions are then further accelerated in grid cage 46, after discrimination to unwanted ions has occurred, and are passed to a third stage 45 having a grid frequency of 2.5 megacycles from R.F. oscillator 40. The ions are further accelerated by grid 48 of the third stage 45 of the tube 10 to be collected and stopped at the collector plate 12. Those ions that have reached the collector plate 12, in turn, form a small pulse or signal which is fed to the amplifier 14 having a detector output. At the same time, a stopping potential from battery source 50 is applied to the collector plate 12 to control the amplitude thereof and to further discriminate those ions which are to be measured and any which have passed through the tube 10 by random effects.

The detected output from the amplifier 14 is then fed to an audio telemetering oscillator 56 which modulates an R.F. transmitter 58. A signal is then radiated by the R.F. transmitter 58 to a ground station for permanently recording and evaluating the information pertaining to the upper atmospheric components measured, as will be described more fully hereinafter.

As indicated, three R.F. fields are used in this tube 10. The first and second fields are spaced so that for a certain R.F. frequency and the proper accelerating potential 34, a particular ion mass will traverse the distance from the filament 16 to the collector plate 12 during the time of exactly five complete cycles of the field at a frequency rate of 2.5 megacycles. The second and third fields are spaced so that with identical conditions the same ion traverses the same distance during seven cycles of the field.

Thus, for a particular set of conditions, only one ion mass will acquire maximum energy from all three fields. A three-stage tube is, therefore, more selective than a single stage tube. The numbers five and seven are chosen in an attempt to eliminate harmonic mass peaks.

It can be shown that the molecular mass number of the ions collected on collector plate 12 is directly proportional to the potential producing the accelerating field and inversely proportional to the square of the product of the frequency of the R.F. field and the spacing of the electrodes confining the R.F. field.

It is immediately evident that there are two methods available for obtaining a mass spectrum, namely varying the frequency of the R.F. field or varying the accelerating potential 34. The latter method is most advantageous because of the relationship between the main component, and harmonics and other unwanted values. A mass spectrum is obtained by sweeping the accelerating potential 34, this method being the simpler of the two.

Figure 2:
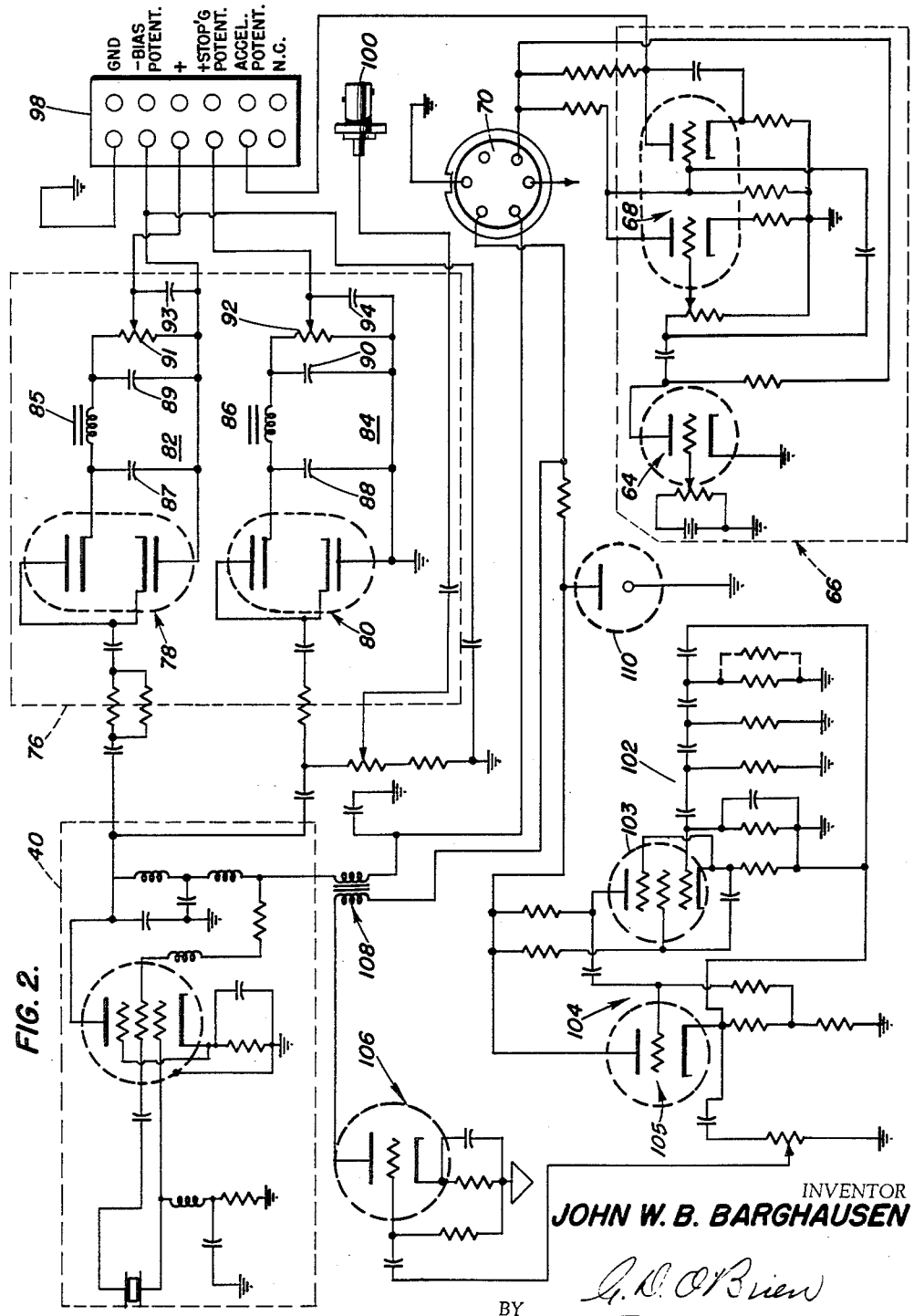
Fig. 2 is a schematic of an audio modulated R.F. oscillator circuit.

The accelerating potential 34, of Fig. 1, can comprise a gas triode 64 which is employed in the circuit 66, of Fig. 2, to give a sawtooth voltage of sufficient amplitude at a repetition rate of approximately one (1) cycle per second. At this repetition rate, a sweep voltage is generated that allows the range of mass 10 to 50 to be scanned during each cycle by the spectrometer tube 10.

Circuit 66 includes, in addition to the triode 64, a dual triode amplifier 68 to create a voltage value from 10 volts to 110 volts for the purpose of scanning the range of mass as previously indicated. Amplifier 68 is connected to the two elements 30 and 48 of the spectrometer tube 10 through power cable socket 70. Cable socket 70 is, therefore, the interconnecting link between circuit 66 and the spectrometer tube 10.

The radio frequency fields in the spectrometer tube 10 are supplied by a conventional 2.5 megacycle per second crystal controlled oscillator 40 of the Pierce-Wells type, as further illustrated in Fig. 2. The D.C. stopping potential 50, Fig. 1, is obtained by rectifying and filtering a portion of the R.F. voltage from the oscillator 40 in the circuit section designated by 76. In this way, any changes in R.F. potential are compensated by corresponding changes in stopping potential. This compensation is very desirable since the amplitude of the mass peaks is extremely critical to changes in either of these voltages.

More specifically, section 76 of the circuitry utilizes conventional dual diode tubes 78 and 80, with each tube having its own filter circuit 82 and 84 for smoothing the rectified voltage. Filter circuit 82 includes capacitors 87 and 89, a smoothing choke 85, with an attenuator control variable resistor 91 and a by-pass capacitor 93. Filter circuit 84 includes, on the other hand, capacitors 88 and 90, a smoothing choke 86, with an attenuator control variable resistor 92 and a by-pass capacitor 94. Filter circuits 82 and 84 are connected to an appropriate terminal block 98 for connection to spectrometer tube 10.

Connector 100 is utilized to feed a portion of the R.F. voltage from oscillator 40 to elements 32, 44, and 45 of tube 10.

Circuit 102, of Fig. 2, includes a telemetering audio oscillator 103 of a conventional type known as the triple T-network tuned, having good stability and whose voltage output is amplified by a triode amplifier circuit 104 including amplifier 105 to increase the voltage amplitude sufficiently to excite a coupling modulator circuit 106. Modulator circuit 106 is coupled to the R.F. plate circuit of R.F. oscillator 40 by means of a transformer 108. A voltage regulator 110 furnishes the plate voltage for the audio oscillator circuit 102 and the triode amplifier circuit 104.

To allow the use of A.C. amplification, the R.F. oscillator 40 supplying the R.F. fields is amplitude modulated at 1000 cycles per second by modulator 106. The 1000 cycle per second oscillator 102 is a standard high altitude aerial rocket telemetering sub-carrier oscillator padded to operate at this frequency with good stability. The amplitude of this signal is adjusted to produce approximately 10 percent modulation of the R.F. voltage. Thus it is seen that the ionic currents corresponding to the mass peaks in the spectrometer tube 10 appear as 1000 cycle alternating currents and can be amplified using A.C. amplification.

Figure 3:
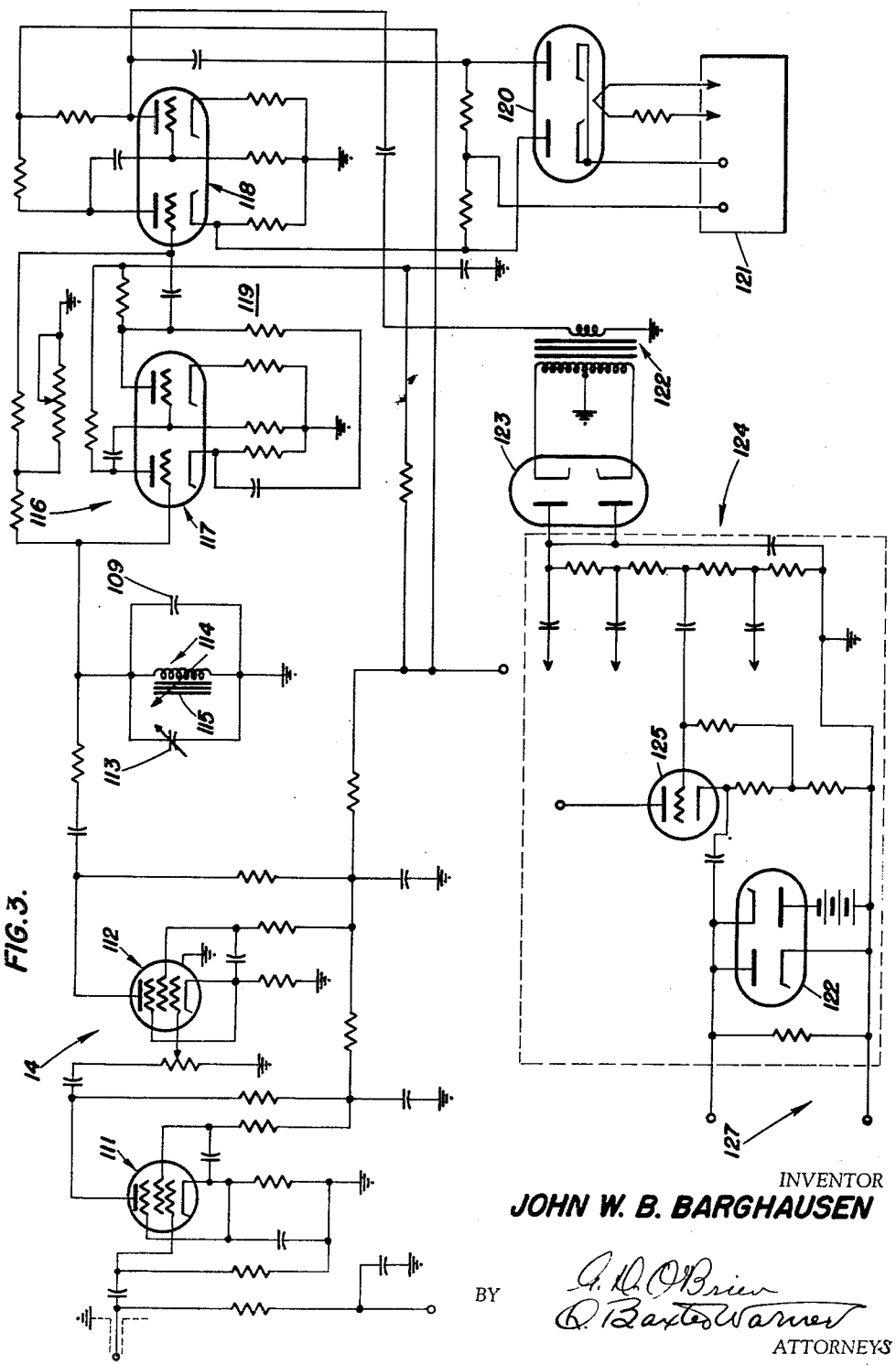
Fig. 3 is a schematic of a mass spectrometer high gain amplifier.

The equipment used to detect and amplify the small ionic currents that traverse the tube 10 at each mass peak is a high gain, A.C. tuned 1000 cycle amplifier 14 with detector output as illustrated in Fig. 3.

The amplifier 14, as indicated above, is a one kilocycle per second high gain, narrow band pass, tuned amplifier. The band width measured at 50 percent response is adjustable from 100 c.p.s. to about ½ c.p.s. The gain at maximum selectivity is approximately $1.8 \times 10^8$. The amplifier output is modified slightly to suit the needs of the telemetering experiment.

Amplifier 14, as shown in Fig. 3, includes two pentode high voltage gain stages 111 and 112 for amplifying the incoming signal from the collector plate 12 of the spectrometer tube 10, as previously indicated, with as good a signal-to-noise ratio as can be obtained. This signal, in turn, is tuned to 1000 cycles frequency by a filter circuit 114 comprising a fixed capacitor 109, a variable capacitor 113, and a variable inductance 115. This filter circuit 114 has a high gain and, therefore, rejects all other frequencies depending upon the width of the feedback adjustment in a feedback circuit 116. This circuit includes a dual triode tube 117 which further sharpens the characteristics of the signal at 1000 c.p.s. and increases the gain thereof.

The signal from network 114 is thus applied to the grid of the dual-triode amplifier tube 117 and also simultaneously to the grid of a second dual triode 118 having the R-C feedback network 119. Network 119 is capable of tuning the band pass or width of the signal from approximately one cycle to 500 cycles in width, thereby also controlling the overall gain of amplifier 14 so as to be able to set the output value thereof with respect to stability and signal-to-noise ratio. Feedback network 119 is a combination of plate to variable grid and plate to fixed cathode of tube 117. The signal is impressed on the grid of tube 117, whose plate output is coupled capacitively to the second section of tube 117.

The signal from dual triode 118 is directed through a dual diode 120 for the purpose of converting it to a direct voltage value to drive a D.C. recorder 121 for viewing on an oscilloscope or vacuum tube voltmeter. The signal from dual triode tube 118 is also coupled to a transformer 122 which, in turn, feeds another dual diode 123 for the purpose of distributing the D.C. voltage in proper proportion across a R-C divider network 124 to actuate the telemetering channels 127 (only one of which is illustrated) at various voltage levels.

Thus, a dual diode rectifier (detector) 120 and a low pass filter (not shown) are used to detect and filter the one kilocycle per second signal from dual triode 118 to give a D.C. potential varying only with the mass peaks. This voltage, as indicated, is divided in a resistor network 124 by factors of 2, 4, and 8. The full output of amplifier 14 and the three divided potentials are then coupled through cathode followers 125 (only one of which is shown) into four separate telemetering channels. The output of each telemetering channel excites, in turn, its separate audio oscillator whose output directly modulates the R.F. transmitter 58 for intelligence which is being recorded at a ground station.

The voltage division is necessary because the amplifier 14 is capable of delivering forty volts while the telemetering channels, such as 127, will accept a signal voltage change of only five volts. With this arrangement, large mass peaks can be measured accurately on the low sensitivity channel while smaller peaks can be easily measured on the intermediate or full output channels. In addition, allowances can be made for changes in signal amplitude with changes in pressure in the spectrometer tube 10.

Figure 4:
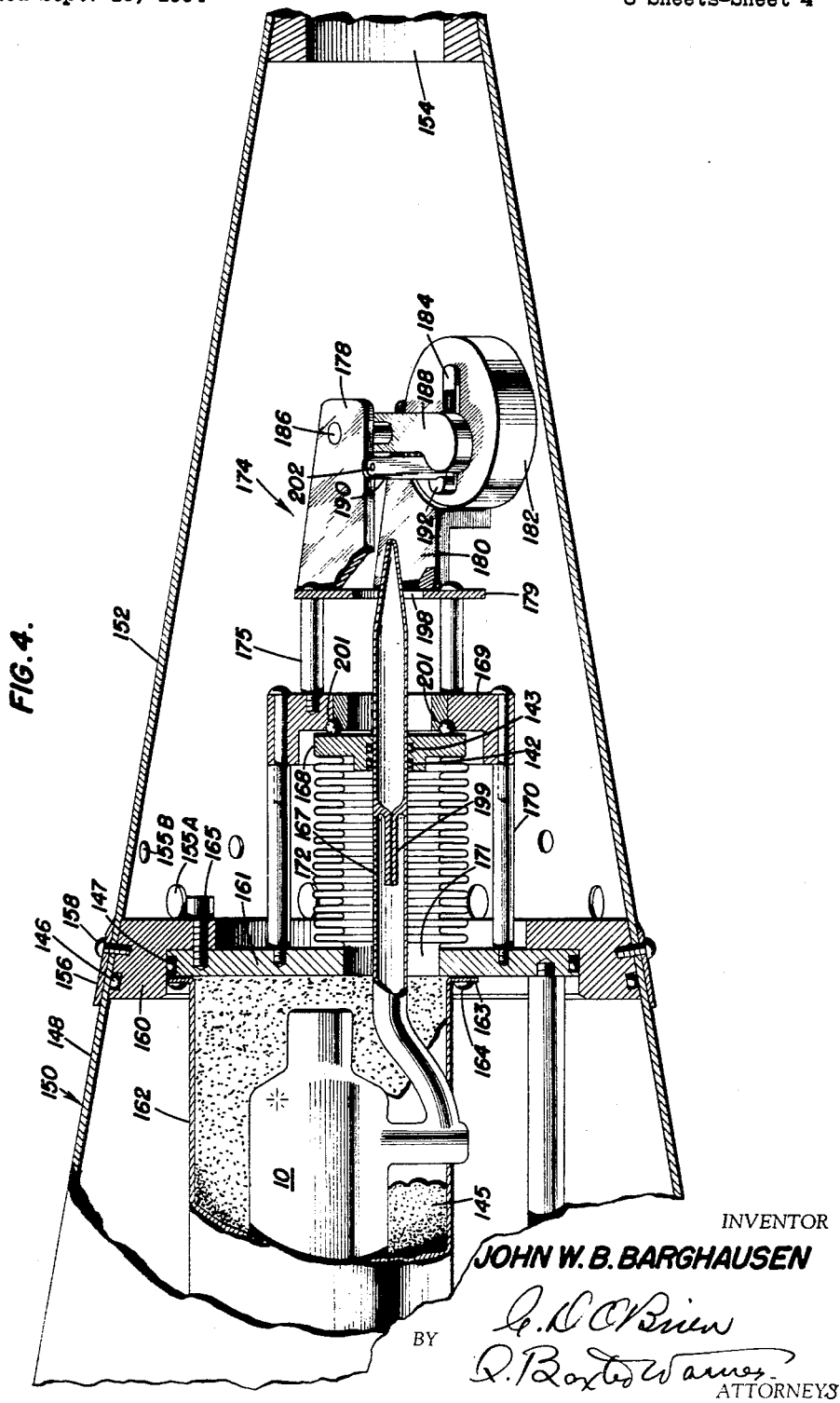
Fig. 4 is a fragmentary view of the forward nose assembly of an aerial rocket, embodying the tubulation for accepting the outside sample of the atmosphere.

Referring now to Fig. 4 of the drawings, the spectrometer tube 10 is shown mounted in an aerial missile 150. This aerial missile 150 has a forward nose divided into two sections or chambers, 148 and 152 for receiving the spectrometer tube and its associated apparatus. Nose cone section 152 is ventilated by a 1½" diameter hole 154 at the forward end thereof, and nine ¾" holes 155A and nine ½" holes 155B in the periphery of the cone section 152. Section 148 comprises an evacuated pressure bulkhead. A flange element 160 separates the two nose sections 148 and 152, and it is utilized for mounting the spectrometer tube apparatus. This flange element 160 is attached to the missile nose by bolts 158, which pass through an annular ring 156 which skirts the missile 150.

As indicated, the spectrometer tube 10 is located in the pressure type bulkhead 148 and in a housing 162 which has a flange 163 provided at one end thereof for attaching the housing 162, by bolts 164, to a flat plate member 161. Plate member 161, in turn, is mounted on the flange element 160 by bolts 165. O-rings 146 and 147 are utilized for sealing the flange element 160 to the missile wall and the flange member 160 and the plate 161, respectively.

The spectrometer tube 10 is mounted in sponge rubber 145 in the housing 162. It has a tubulation member 167 which passes through an opening 171 in plate member 161. This tubulation member 167 also passes through a sealing bellows 172, a plate member 168 and a second plate member 169, both of which having suitable openings therein. Plate member 169 is attached to plate member 161 by means of bolts 170. A series of O-rings 142, 143, and 201 are utilized to seal the areas between the plate member 168 and the tubulation member 167, and the plate member 168 and plate member 169. A break-off mechanism 174 is mounted on plate 169 by means of bolts 175 which pass through a base 179, which is used for mounting the break-off or hammer mechanism 174.

Break-off or hammer mechanism 174 includes two side plates 178 and 180 mounted on base 179 for mounting a pendulum hammer 188 which is pivotally mounted on a shaft 186 that passes through the side plates 178 and 180. This break-off or hammer mechanism also includes a spring housing assembly 182 which has a spring operating in a cylinder for triggering or biasing the hammer 188. A locking dog 190, pivotally attached to plate 178 at 202, engages a pawl 192, which secures the locking dog 190 in an inoperative position. A relay operated by a fuel-cut receiver located in missile 150, both of which are not shown, was utilized in conjunction with a solenoid to release pawl 192, which, in turn, released the locking dog 190 when the missile reached a desired point along a trajectory.

The tubulation member 167, it is to be noted, projects through an opening 198 provided in the base plate 179 so that when the locking dog 190 is released by the pawl 192, upon operation of the relay, the spring in the spring housing assembly 182 causes the hammer to rotate to break the tubulation element 167.

Tubulation element 167 has a restriction 199 provided therein, to protect the spectrometer tube 10 proper, that is, to prevent glass particles from entering into the spectrometer tube 10 upon the breakage of the tubulation element 167 by the hammer 188. It is the purpose of the bellows 172, the plate elements 168 and 169 to prevent leakage into the pressurized bulkhead section 148. The plate member 168 and the bellows 172 also act as a bearing support for the tubulation member 167.

The spectrometer tube 10 is pumped to a pressure which is estimated to be lower than the surrounding atmosphere that the tube 10 is to be used in. The reason for this is to prevent burning out of the tube element 16 in the filament circuit 18 shown in Fig. 1.

Telemetering is accomplished with a modified FM/FM system employing seven intelligence bands modulating two transmitters 58 operating on separate frequencies in the range of 215 to 225 megacycles per second. A notch antenna was installed in one of the missile fins and fed simultaneously by both transmitters through a suitable coupler for transmitting to the ground station. The seven intelligence bands are assigned as follows:

| Band | |
|---|---|
| Band 1 | Spectrometer tube emission. |
| Band 2 | Amplifier output (full). |
| Band 3 | Amplifier output /2. |
| Band 4 | Amplifier output /4. |
| Band 5 | Amplifier output /8. |
| Band 6 | Stopping potential. |
| Band 7 | Accelerating potential. |

The standard fuel cut-off receiver (conventional missile equipment), operating in a fail-safe condition, released the spectrometer tube break-off mechanism 174 by radio command in addition to performing its regular function of emergency fuel cut-off. This additional function was accomplished with the use of an auxiliary relay and time delay mechanism. These units serve to set up the system for fuel termination during the rocket motor burning period and then shift over to allow the seal breaking operation of tubulation 167 to occur upon command after 150 seconds of flight of the missile 150.

Power for vacuum tube heaters was preferably supplied by four Willard type 20-2 aircraft storage batteries connected in series. Each unit powered from these batteries has a separate series dropping resistor to reduce the 8 volts to 6.6 volts. Power for the filament 16 in the spectrometer tube 10 was supplied by two Willard type 60-2 aircraft storage batteries connected in series. A rheostat was used to adjust the filament current to give the proper emission. Plate voltage for the vacuum tubes was supplied by three dynamotors. One dynamotor supplied regulated 275 volts to the R.F. oscillator 40. A second dynamotor supplied regulated 275 volts to the high gain amplifier 14. The third dynamotor supplied 200 volts to all other units. To obtain 335 volts for the sweep oscillator 64 and amplifier 68, 135 volts of dry batteries were connected in series with the 200 volt supply. A Willard type ER 8-28 aircraft storage battery supplied primary power to the dynamotors. Various low drain bias potentials for the spectrometer tube 10 were supplied by small dry batteries 22, 25, and 29, having the magnitudes previously described.

The R.F. spectrometer was operated on a vacuum system to explore the capabilities of the tube 10 and to determine the optimum operating conditions with respect to the manner in which it was used in the missile 150. In particular, it was necessary to determine how accurately the tube 10 would measure the abundance ratio of nitrogen and oxygen in a known mixture, how this ratio was affected by varying tube parameters, and the manner in which the ratio was affected by changing gas pressure.

It was found that at gas pressures below $10^{-4}$ mm. Hg, the apparent nitrogen to oxygen ratio remained fairly constant at a value about 1.5 times greater than the true ratio of the gas mixture injected into the tube. This difference in ratio is believed to be due to some of the oxygen from the surrounding gas combining with the hot filament 16. It was also found that the apparent nitrogen to oxygen ratio changed markedly as the pressure increased above $10^{-4}$ mm. Hg. The apparent ratio of all mixtures analyzed, decreased rapidly above this pressure to a value of about one between $10^{-3}$ and $10^{-2}$ mm. Hg.

As the various tube parameters were varied, changes occurred in the signal amplitude and the amplitude and number of harmonic peaks present but the apparent nitrogen to oxygen ratio remained unchanged. These effects were particularly critical to changes in R.F. voltage and stopping potential.

Figure 5:
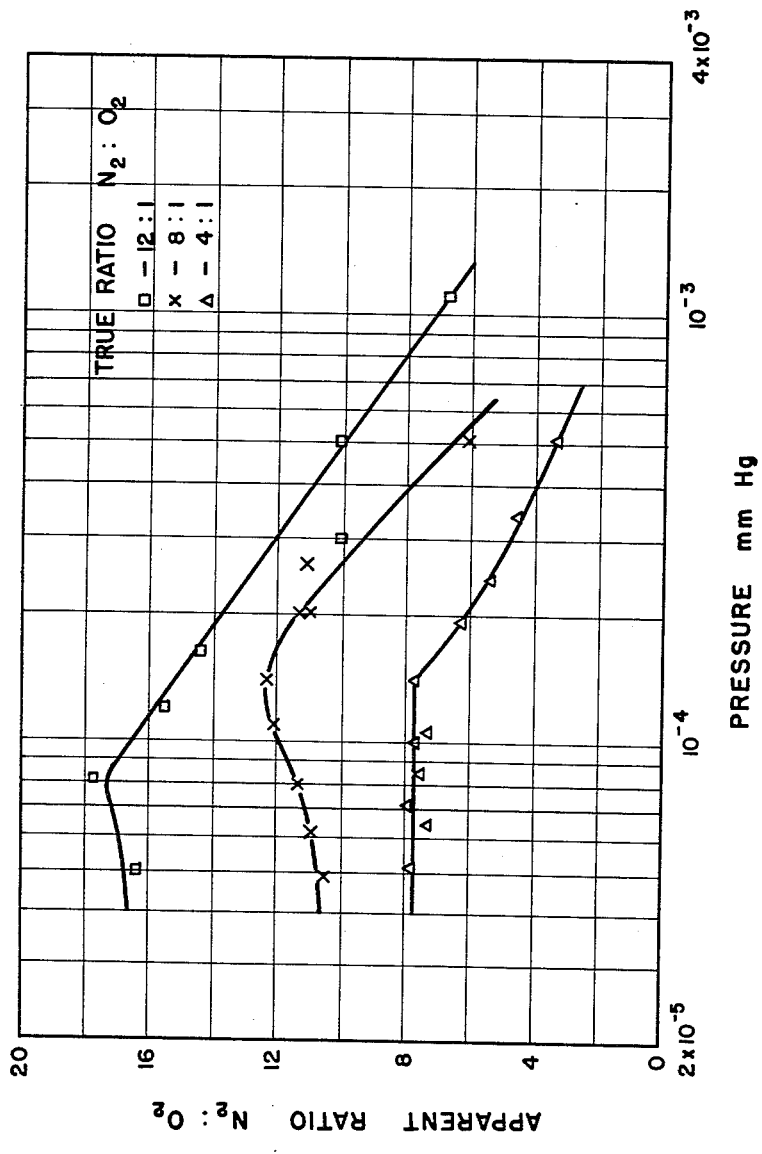
Fig. 5 shows curves of the apparent ratio $N_2/O_2$ versus pressure for various true ratios for the radio frequency spectrometer.

From the above it is seen that a complete calibration of the tube 10 was necessary using gas mixtures of different ratios at the pressures present in the region in which the tube 10 would be operating during the flight of the rocket missile 150. Three mixtures of nitrogen-oxygen gas were made up with $N_2/O_2$ ratios of 4/1, 8/1, and 12/1. The spectrometer tube 10 was calibrated with these mixtures at several pressures in the region between $10^{-5}$ and $10^{-3}$ mm. Hg. The complete instrumentation was used during the calibrations with the data being transmitted over the telemetering radio link and recorded by the regular ground station equipment. This procedure allowed a checkout of the complete system and gave a true calibration by simulating flight conditions. These data are plotted in Fig. 5.

Figure 6:
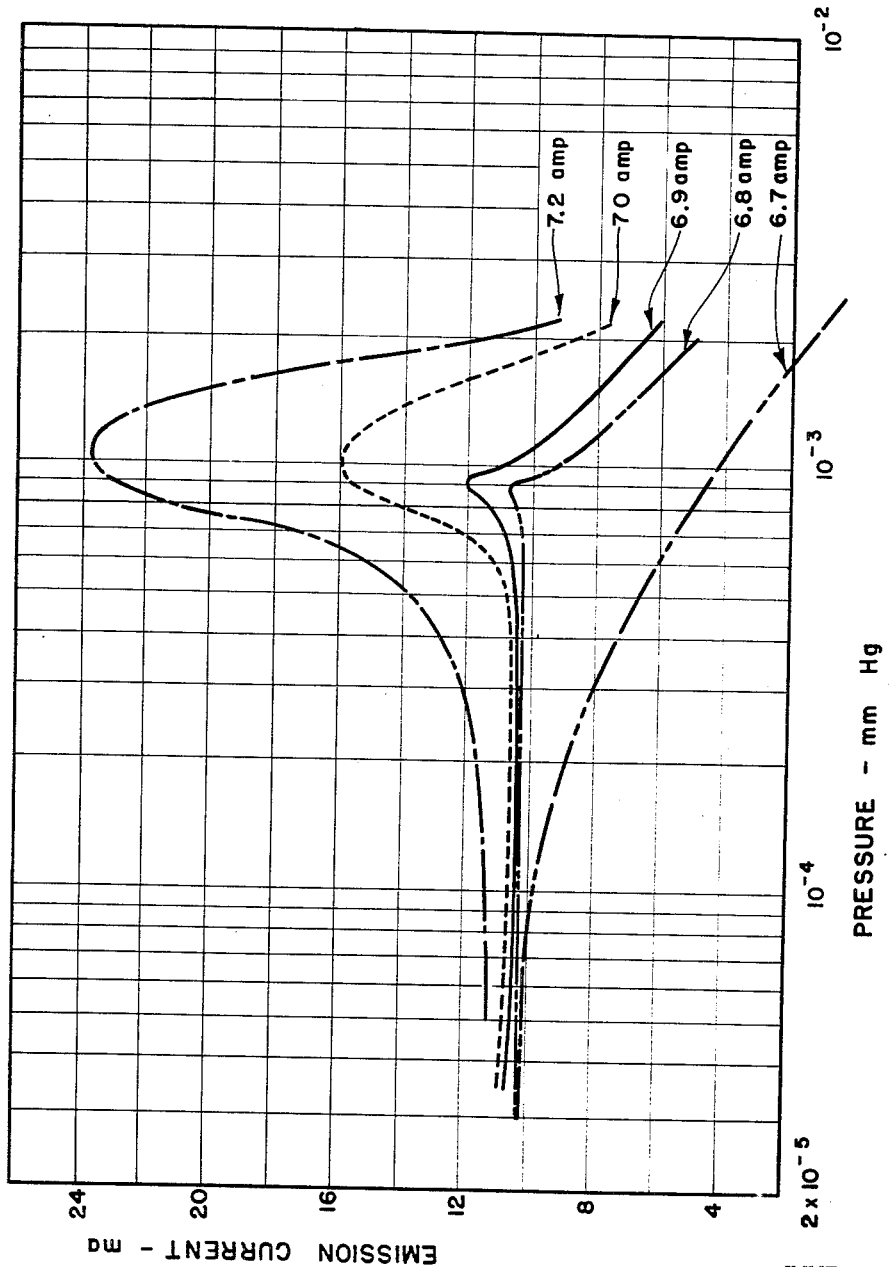
Fig. 6 shows curves of the emission current versus pressure for various values of filament current.
Figure 7:
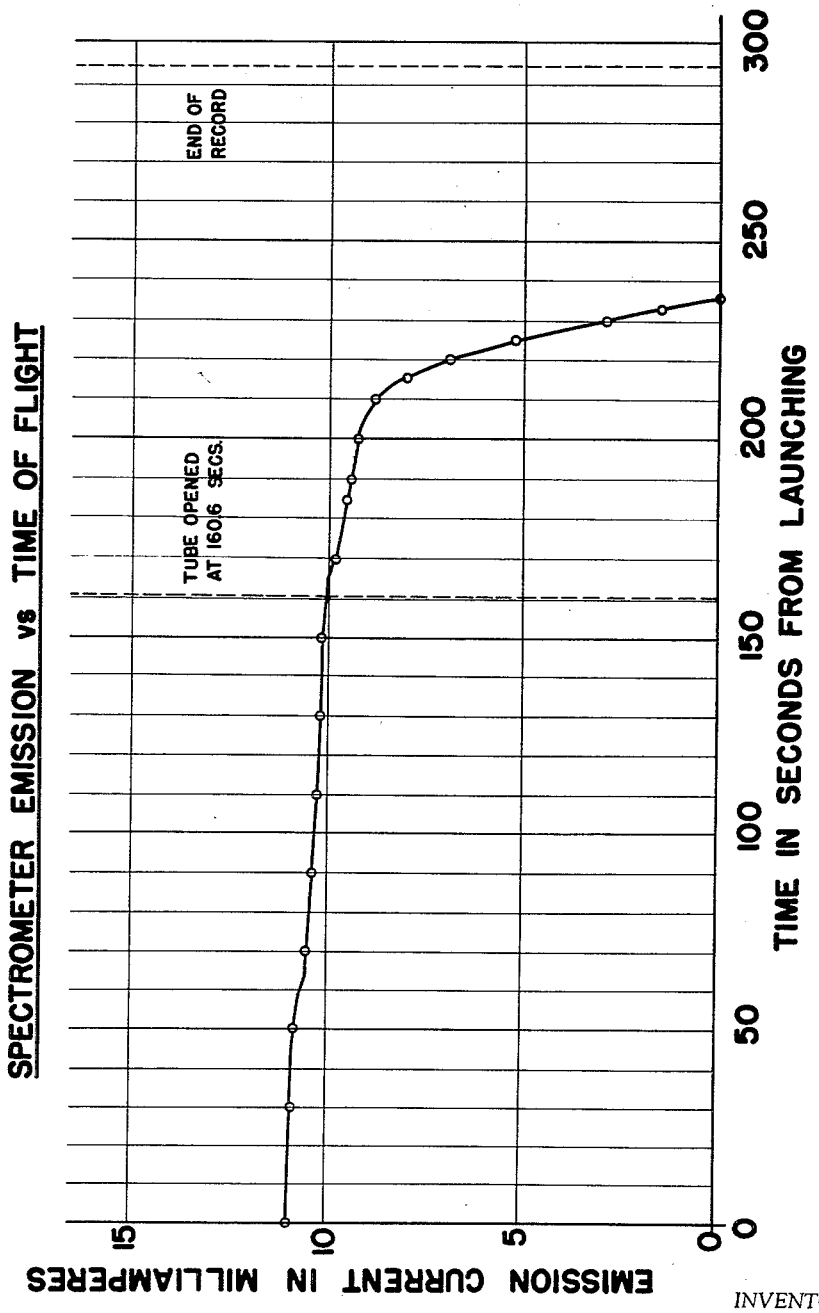
Fig. 7 shows a curve of emission current versus time of flight from launching of the missile.

To determine the optimum value of emission for the expected operating conditions, measurements were made of emission current versus pressure in the tube for several values of filament current. These data are plotted in Fig. 6. As indicated from these curves, 6.9 amperes filament current appears most suitable and was therefore the value used since, for this setting, the emission current remains constant over the widest range of pressures. The emission current was telemetered throughout the flight of the missile 150 to obtain a check of the operating point and to give an idea of the operating pressure.

The ambient pressure at 100 kilometers is approximately $5 \times 10^{-4}$ mm. Hg[3]. Below this altitude, the ambient pressure is too high for the spectrometer to give unambiguous results if the full pressure is immediately admitted. In order to obtain significant measurements even if the rocket flight was somewhat subnormal and if break-off of the tubulation 167 did not occur at the peak of the trajectory of the missile 150, arrangements were made to let the pressure in the tube 10 slowly leak up from $10^{-6}$ mm. Hg to ambient. Therefore, the constriction 199 was provided with a one (1) millimeter aperture. The constriction 199 was made four (4) centimeters long, and it was placed in the tabulation 167 conducting the air into the spectrometer tube 10. With this constriction 199, it was calculated that after opening the tube 10, 30 seconds would elapse before the pressure reached substantially the full ambient value. During this time, sufficient data would be obtained to produce a curve that could be compared with those of Fig. 5.

The amplifier output divider and cathode follower circuits shown in Fig. 3 were calibrated for signal amplitude with a 20 c.p.s. signal so that measurements from different channels, such as 127, could be accurately compared.

It should be mentioned here that a single peak at mass 25 was observed as the spectrometer operated in the evacuated, sealed-off condition. A plausible explanation for the appearance of this peak is that some hydrocarbon vapor from the oil in the diffusion pump may have remained in the tube 10. This mass peak, however, afforded a splendid opportunity for monitoring the operation of the spectrometer tube and associated equipment prior to the launching of the missile 150.

In order to prevent carrying trapped air aloft, the bulkhead section 148 of missile 150 was pressurized with helium and the nose cone section 150 was flushed with helium prior to launching.

In Fig. 8 there is illustrated a curve of the amplifier output in volts versus the ion accelerating potential 34 also measured in volts.

Obviously many modifications and variations of the present invention are possible in the light of the above teachings. It is therefore to be understood that within the scope of the appended claims the invention may be practiced otherwise than as specifically described.

What is claimed is:

1. A mass spectrometer arrangement for sampling components of the upper atmosphere of the earth, including, in combination; an aerial missile having a first, unpressurized chamber in communication with the atmosphere and a second, pressurized chamber sealed from the atmosphere, flange means within said missile separating said chambers, a mass spectrometer mounted on said flange means within said second chamber and including an R.F. tube, means within said missile connected to said spectrometer for telemetering information concerning said atmospheric components to a remote point, an elongated tubulation connected with and extending from said tube through said flange means and into said first chamber, the interiors of said tube and said tubulation being in communication and said tubulation being initially closed at its outer end to thereby maintain said tube in a sealed, evacuated condition, seal means carried by said flange means for sealing said tabulation thereto, and remotely-operable break-off means adapted to fracture the outer end of said tubulation to thereby allow atmospheric components to be introduced into said tube, said break-off means being mounted on said flange means within said first chamber and including a pair of side plates disposed about said tubulation, a pendulum hammer pivotally attached to said plates and positioned to make striking contact with said outer end to thereby fracture the same, spring means attached to one of said plates and to said hammer urging said hammer into such contact, and remotely-operable latch means attached to said plates and arranged to initially hold said hammer against the force of said spring and out of contact with said outer end, said latch means being remotely actuated to release said hammer when said missile has attained a point on its trajectory at which it is desired to sample the atmospheric components.

2. A mass spectrometer arrangement as claimed in claim 1, including additionally means in said tubulation for blocking the entry of solid particles tending to enter said tube upon fracturing of said outer end.

(References on following page)

References Cited in the file of this patent

UNITED STATES PATENTS

| | | |
|---|---|---|
| 2,411,157 | Fene et al. | Nov. 19, 1946 |
| 2,535,032 | Bennett | Dec. 26, 1950 |
| 2,768,301 | Bennett | Oct. 23, 1956 |

OTHER REFERENCES

Schultz, F. V., Spencer N. W., Reifman, A.: University of Michigan Engineering Research Institute Upper Air Research Programme, report No. 2, July 1, 1958.

Singer: Research in the Upper Atmosphere with Sounding Rockets and Earth Satellite Vehicles; Journal of the British Interplanetary Society, vol. II, No. 2., March 1952, pages 61–73.

Townsend, J. W.: "Radiofrequency Mass Spectrometer for Upper Air Research," Review of Scientific Instruments, volume 23, number 10, October 1952, pp. 538–541.

Frontier to Space by E. Burgess, MacMillan Co., 1956, pages 66–70.